No. 703,420. Patented July 1, 1902.
R. M. HUNTER.
PROCESS OF MAKING ELECTRIC ACCUMULATOR PLATES.
(Application filed Aug. 1, 1899.)
(No Model.)
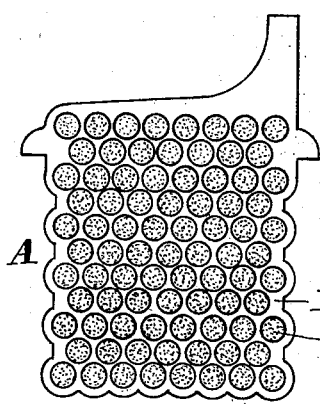
FIG. 1
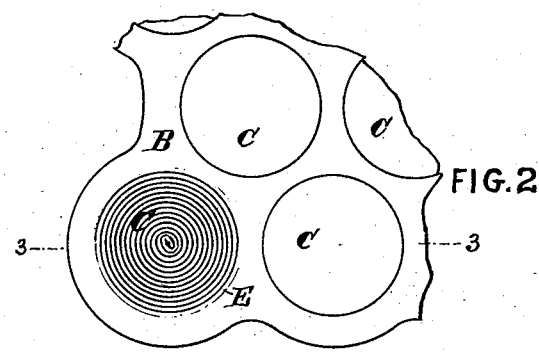
FIG. 2
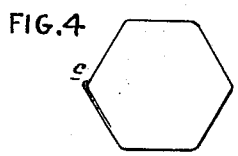
FIG. 4
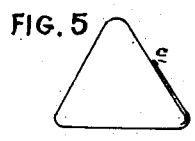
FIG. 5
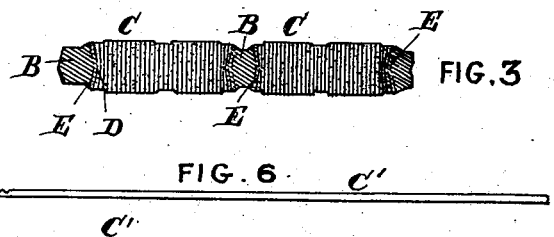
FIG. 3
FIG. 6
FIG. 7
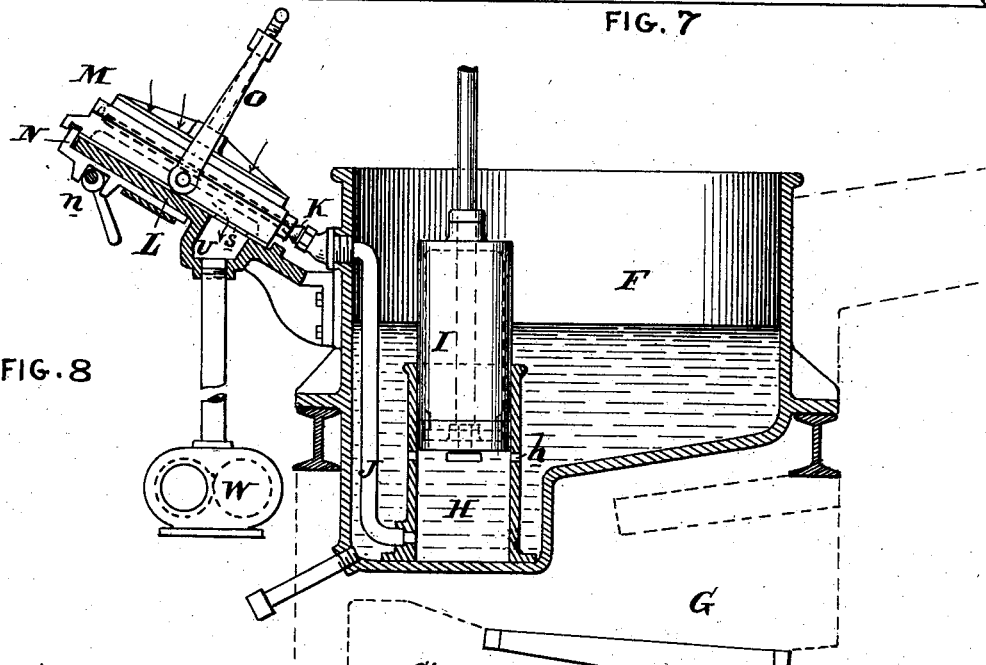
FIG. 8
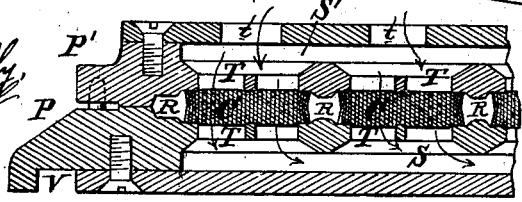
FIG. 9
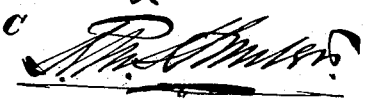
Inventor
Attest

UNITED STATES PATENT OFFICE.

RUDOLPH M. HUNTER, OF PHILADELPHIA, PENNSYLVANIA.

PROCESS OF MAKING ELECTRIC ACCUMULATOR-PLATES.

SPECIFICATION forming part of Letters Patent No. 703,420, dated July 1, 1902.

Application filed August 1, 1899. Serial No. 725,748. (No model.)

*To all whom it may concern:*

Be it known that I, RUDOLPH M. HUNTER, of the city and county of Philadelphia, State of Pennsylvania, have invented an Improvement in Electrical Accumulators, of which the following is a specification.

My invention has reference to the manufacture of electrical accumulators; and it consists of certain improvements set out in the following specification and typified in the accompanying drawings, which form a part thereof.

My invention set out in this application (Case 309,) is especially directed to the manufacture of the positive plates of storage batteries or electrical accumulators.

The object of my invention is to so construct an electrical accumulator or storage-battery element that it shall possess great durability and a very low resistance.

By my invention I am enabled to cheaply construct the positive plates and secure the best efficiency and longevity with a minimum weight.

In storage batteries as heretofore constructed the positive plates have been made either as a grooved grid or kindred structure and subjected to electrolytic action to transform certain portions of them into a peroxid of lead, or else as a grid embodying openings or reticular formations which have been packed with a peroxid-of-lead compound, or else, again, as a cast grid provided with apertures which have been filled with sheet-lead plugs driven in and subsequently rendered active by electrolytic action. While the last-mentioned method of constructing a positive element for a secondary battery has mechanical advantages over the two first mentioned with reference to manufacture in its favor, yet no positive union between the active material and the grid results, and hence in time the internal resistance becomes abnormally high and a consequent loss in efficiency ensues.

By my method of making the positive plate I secure the greatest strength with the least weight of material sufficient to insure durability, and, furthermore, obtain an absolute union between the body metal and the active material in the battery, in which the several parts making up the plate are assembled in process of manufacture.

In carrying out the manufacture of my improved battery-plate I first form a series of segments of spirally or otherwise folded or coiled strips of sheet-lead, which I place in a specially-constructed mold. While a cooling medium, such as cold air, is drawn or forced through the coiled or folded strips of lead in the mold I cast about said strips or specially-prepared lead segments the lead body which is to unite with them and cause them to constitute with the body a single mechanically-integral structure or plate. The result of this operation is that the hot fluid lead is not permitted to fuse the coiled or folded strips except at their outer portions, where it secures the formation between them and the body metal of an absolute fused joint, which reduces to a minimum the electrical resistance between the strips and the body metal of the plate and which no amount of jarring or rough usage can destroy. The low internal electrical resistance is thus permanently insured. The plates so constructed are then adapted, in selected numbers, connected by a bridge, to be built up in a positive element and to be subjected to a forming process by the passage of a current of requisite strength through the element until the surfaces of the coiled or folded strips are converted into peroxid of lead to the desired depth. The element is then in condition for use. As the interior portions of the lead strips or segments retain their metallic condition, they act as an excellent conductor to convey the current to the body metal of the plate, to which, as explained, said strips are fused or integrally connected. By shrinking the supporting or body metal onto the segments which are to become active it is evident that, with or without also fusing said segments to the body of the plate, an intimate and close union will be made between said body and the active material formed upon the segments. Inasmuch as the segments are easily made and placed in the mold, the operation of casting and shrinking the body metal upon them is quickly and cheaply accomplished. Where the thickness of the strips is so great that they do not fuse in the casting of the body metal upon them, the passage of a cooling medium through them may be omitted. In fact, in such case only the outer portions of strips need be thick, while the central portions may be relatively thin. In cases where the thickness of the strips guards them against bodily fusing without having to resort to the use of the cooling medium their outer surfaces may be roughened or abraded to form thin fusible projections which will fuse when the hot body metal is forced into the mold and into contact with them. This would insure a positive fused union between the segments and body metal in cases where thick strips are employed, thus securing the great advantage resulting from low internal resistance.

My invention will be better understood by reference to the accompanying drawings, in which—

Figure 1 is an elevation of a completed plate constituting a positive element of the battery and embodying my improvements. Fig. 2 is an enlarged view of a portion of the plate of Fig. 1. Fig. 3 is a longitudinal section of the plate of Fig. 2 on the line 3 3 of said figure. Figs. 4 and 5 are diagrams showing other typical shapes which may be given to the wound or folded strips of lead to become active. Figs. 6 and 7 are edge views of strips of lead conveniently used in the making of the segments of the plate. Fig. 8 is a sectional elevation of molding apparatus conveniently adapted for use in making my improved battery-plate; and Fig. 9 is an enlarged section of a portion of the mold shown in Fig. 8, with the segments in place and in condition to receive the molten lead.

A is the battery-plate complete, comprising the solid lead body-frame B and the segments C of active material or material adapted to become active, as many of which are to be used as is consistent with the strength of the frame B. The segments C are each preferably formed of a thin strip of lead coiled or folded upon itself, as shown in Figs. 2, 3, 4, and 5, for example. The edge or perimeters of the segments may be concaved, as indicated at E, so as to increase the hold of the lead frame upon them. The surfaces of the strips C', of which the segments are composed, may be corrugated, serrated, or otherwise roughened, as indicated at $C^2$, to obviate excessive density, to increase the surface adapted to become active, and also to present an exterior capable of becoming readily fused to unite with the metal of the body-frame B in the operation of casting. The outer portions of the strips may, if desired, be thinned, as shown at $C^3$, Fig. 6, and also roughened on the surface, as indicated at $C^4$, to secure more ready fusing of the perimeter of the segment to the body metal.

For convenience in holding the wound or folded segments intact within the mold and for preventing the cast lead from entering between the layers of the segment at the end of the winding or folding the end may be soldered, as at c, Fig. 4.

In a preferred embodiment of my invention the lead frame B and the outer end of the segments are fused together, a result conveniently accomplished by employing a frail or readily-fusible outer end to the strip secured either by reducing the mass of metal in the end of the strip by roughening or abrading the end of the strip, or by doing both. This joiner of the parts to form an integral structure is shown in Fig. 2, where the spiral strip is gradually blended into the metal composing the body-frame B. As a result of this construction it is evident that by the shrinking of the frame metal B upon the segments C the most intimate contact will be secured, while by the fusing of said body metal to the outer circumferential portions of the segments the internal resistance of the plate will be greatly reduced and its efficiency consequently increased.

Where a fused connection between the body-frame and the segments is well established, an indented or depressed periphery to the latter is unnecessary. I prefer, however, to employ such indentation, as the action of the dies in forming it will tend to solidify and strengthen the central portion of the segment.

While in Figs. 1 and 2 I have shown the segments as circular and spirally wound, it is yet evident that they may be square, irregular, or polygonal in outline, as typically indicated in Figs. 4 and 5. It is not, moreover, as already stated, essential that the strips be wound spirally, as they may be folded or wrapped in any suitable manner to secure the porous structure desired.

M, Figs. 8 and 9, is a mold in which to cast the lead body-frame B about and upon the segments C. This mold conveniently consists of two parts or sections P and P', the opposing faces of which are conformed to receive the segments and to leave about them spaces, as at R, into which to flow the molten lead. The inner faces of the mold-sections which respectively confront the segments are provided with perforations or openings T, which communicate with chambers S S', respectively, within said sections and of which the chamber S' is open to the atmosphere. The apertures T are somewhat smaller in diameter than the diameter of the segments, so that the outer edges of the latter are clamped tightly down upon the interior faces of the mold to make a tight joint. The mold parts P P' may be clamped together by a suitable screw-clamp O. When the mold parts have been supplied with the segments C and properly clamped together, the mold as a whole is conveniently placed upon an inclined table L, and an orifice through one of its sides, which communicates with the mold-spaces R, is brought into contact with the nozzle K of a vat F and forced thereon, conveniently by a movable jaw N, moved by an eccentric n, the end of which jaw works in a groove V on the bottom of the mold. When the parts have been clamped in the foregoing position, the lower chamber S of the mold will, as shown in Fig. 8, communicate, by a suitable aperture s, conveniently through the interposition of a chamber U, with the suction side of an exhauster W. By the creation of a vacuum in the mold-chamber S air will be caused to flow through the chamber S' and between the layers of the segments, so as to keep the central portions of said segments cool during the casting operation, and thereby prevent fusing, except as to the outer ends of the segments, which come into direct contact with the fluid lead and may be fused integral with the body of the frame B when cast upon them. This fusing of the outer end portions of the segments to the body metal may be materially facilitated by the employment of the roughened surfaces already referred to and indicated at $C^2$, Fig. 7.

The nozzle K connects by a pipe J with the bottom of a cylinder H, arranged within the lower part of a vat F, in which lead, with or without a given quantity of antimony, (and bismuth, if desired,) is maintained in a fused condition by heat derived from a suitable furnace G. A piston or plunger I works within the cylinder H and when raised exposes apertures h in the walls of said cylinder and permits the molten lead to flow into it. When the plunger I descends, it forces the molten lead up the pipe J into the spaces R of the mold, and thus the body-frame B is cast about the segments under a pressure which will secure density and perfect form. The pressure, moreover, insures close contact of the molten metal with the outer edges of the segments, a contact which is increased by the shrinking which takes place when the plate cools. As this shrinking action of the body metal upon the segments takes place before any of the "forming" of the segments electrically is resorted to, it is evident that the mechanical contact is excellent and liquid-tight, even where no fusing between the body and segment occurs. This shrinking action prior to the forming process in connection with the manufacture of a battery-plate in the manner herein described is a feature of great importance, since it secures both strength and low internal resistance in the completed plate. After the plate has been made in the foregoing manner it is separately, or in conjunction with similar plates, placed in proper relation to a negative plate or plates in an electrolyte of diluted sulfuric acid or other suitable oxidizing acid solution, and a current of electricity is passed through them for a suitable period to convert the surfaces of the metal of the segments into the peroxid of lead. The plates thus prepared may then be employed in the usual manner in a storage battery, with the result that with each charge the peroxid formation will be somewhat increased until in time every portion of the segments will have become active. In positive plates for storage batteries thus formed the active material of the segments will be so intimately connected with the body or frame that it will retain during its life the low internal resistance even under the most severe strains of hard usage of the batteries, as in automobiles.

While the cooling of the segments during the casting operation is most satisfactorily accomplished by sucking cool air through them, it is evident that the air might be forced through them, or that instead of air any gas or fluid may be used.

When the strips of which the segments are composed are sufficiently thick, they may be clamped tightly in place in the mold and the casting of the lead be accomplished without resort to the passage through the segments of a cooling medium.

As already stated, the form into which the strips composing the segments may be folded or wound is not essential so long as the strips are caused to present an extended surface to the electrolyte. If desired, moreover, the segments may be mechanically made by casting or otherwise forming them and be then placed in the mold and have the lead cast upon them, and therefore, although I prefer the construction by winding, I do not limit myself to it or to kindred minor details.

Having now described my invention, what I claim as new, and desire to secure by Letters Patent, is—

1. The process of making an accumulator-plate which consists in first forming a series of elementary parts with a large number of thin lead walls, in then placing said elementary parts in a mold and clamping their outer edges tightly, in then passing a cooling medium through the central or interior portions of the elementary parts, in then forcing molten lead into the mold so as to cast it around the segments under pressure, and in finally transforming the surfaces of the thin walls of the segments into peroxid of lead.

2. The process for making a positive plate for an electrical accumulator which consists in forming an elementary part of lead in light porous condition, then placing said elementary part in a mold and clamping the outer edges near the periphery tightly, then passing a cooling medium through the central or interior portion of the elementary part, and while thus cooled casting a lead body-plate about said elementary part.

3. The herein-described method of making a positive plate for an electrical accumulator, which consists in forming a series of elementary parts of lead with highly-fusible peripheries formed by wrapping or folding a lead strip upon itself, placing a series of said elementary parts in a mold and shielding all but their peripheries, positively cooling the central portions of all of the elementary parts, casting a body of lead or lead alloy entirely around and between the exposed peripheries of said elementary parts and by its heat fusing the peripheries alone of the elementary parts into an integral structure with the body metal to make a close clean electrical connection, and finally transforming those portions of the surfaces of the segments not fused to the body into peroxid of lead.

4. The herein-described process of making a positive plate for an electrical accumulator, which consists in forming a series of elementary parts each presenting a large number of thin lead walls wrapped upon each other, placing said segments in a mold, retaining their central portions only in a cool condition, casting a lead body-plate entirely around their peripheral edges, fusing their outer peripheral edges to said plate to constitute an integral structure, condensing the interior layers of the elementary parts upon each other by the cooling of the body-plate, and finally subjecting the plate to an electrolytic action to convert the outer surfaces of the thin lead walls of the elementary parts into peroxid of lead.

5. The herein-described method of making a positive plate for an electrical accumulator, which consists in wrapping or folding a long strip of lead into elementary parts each having a series of thin layers resting one upon the other, in placing said elementary parts between the side walls of a mold of greater cubic capacity then the mass of the elementary parts and making tight joints between the exterior side circumferential edges of the elementary parts and the inside walls of the mold, and in finally filling the space within the mold entirely around and between the circumferential peripheries of the elementary parts with molten lead or its alloy and solidifying the same before removal from the mold, whereby the shrinking of the body metal condenses the layers of the elementary parts one upon the other to greatly strengthen the finished plate and reduce the internal electrical resistance when the plate is formed.

In testimony of which invention I have hereunto set my hand.

R. M. HUNTER.

Witnesses:
J. W. KENWORTHY,
R. M. KELLY.